United States Patent
Orkisz et al.

(10) Patent No.: US 12,140,490 B2
(45) Date of Patent: Nov. 12, 2024

(54) ROTATING MACHINE SPEED ESTIMATION

(71) Applicant: TURBO SYSTEMS SWITZERLAND LTD., Baden (CH)

(72) Inventors: Michal Orkisz, Cracow (PL); James Ottewill, Cracow (PL); Jochen Traub, Ehrendingen (CH)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 267 days.

(21) Appl. No.: 17/919,933

(22) PCT Filed: Apr. 19, 2021

(86) PCT No.: PCT/EP2021/060095
§ 371 (c)(1),
(2) Date: Oct. 19, 2022

(87) PCT Pub. No.: WO2021/213982
PCT Pub. Date: Oct. 28, 2021

(65) Prior Publication Data
US 2023/0152178 A1    May 18, 2023

(30) Foreign Application Priority Data
Apr. 20, 2020  (EP) .................................... 20170418

(51) Int. Cl.
  *G01M 1/22*    (2006.01)
  *F01D 21/00*   (2006.01)
  (Continued)

(52) U.S. Cl.
  CPC ............. *G01M 1/22* (2013.01); *F01D 21/003* (2013.01); *G01H 1/003* (2013.01); *G01M 13/04* (2013.01)

(58) Field of Classification Search
  CPC ........ G01M 1/22; G01M 15/05; G01M 13/04; G01P 3/56; F16F 15/322; G01H 1/003; F01D 21/003
  See application file for complete search history.

(56) References Cited

U.S. PATENT DOCUMENTS 4,751,657 A *  6/1988  Imam ..................... G01H 1/003
                                                      702/56
6,651,012 B1   11/2003  Bechhoefer
(Continued)

FOREIGN PATENT DOCUMENTS

EP    0863404 A1   9/1998
EP    1050863 B1   11/2000

OTHER PUBLICATIONS

International Search Report and Written Opinion, in International Application No. PCT/EP2021/060095, mailed Jul. 12, 2021, 21 pages.
(Continued)

Primary Examiner — Syed O Hasan
(74) Attorney, Agent, or Firm — Meunier Carlin & Curfman LLC

(57) ABSTRACT

Embodiments of a process for estimating a rotational speed of a rotating component and a process for estimating an acceptable rotor imbalance of a rotating component are provided herein. The process for estimating the rotational speed of a rotating component for a charging system comprises measuring a vibration signal of the rotating component by means of a sensor; and identifying harmonic train members from a plurality of peaked components of the vibration signal. Further, the process comprises determining a candidate fundamental frequency from the harmonic train members; and determining a derived vibration amplitude value from the vibration signal. This determination involves a filtering of the vibration signal, removing periodic contri-
(Continued)

butions having a high amplitude. A scalar value is then derived from the filtered signal as a derived vibration amplitude value, representing the integrated total vibration amplitude of the filtered signal at the current speed. The process comprises verifying a consistency condition between the derived vibration amplitude value and the candidate fundamental frequency using a predetermined speed-amplitude map, associating speed values with their respective derived vibration amplitude values. For determining an acceptable rotor imbalance, a speed-amplitude map obtained at a time when the imbalance is acceptable is compared to a speed-amplitude map at a later point in time. An offset between the maps may indicate an inacceptable imbalance.

13 Claims, 2 Drawing Sheets

(51) Int. Cl.
    *G01H 1/00*         (2006.01)
    *G01M 13/04*     (2019.01)

(56) References Cited

U.S. PATENT DOCUMENTS

| | | | | |
|---|---|---|---|---|
| 10,288,640 | B2* | 5/2019 | Zabulon | G01D 5/145 |
| 2010/0179775 | A1* | 7/2010 | Loftus | G01H 1/003 |
| | | | | 702/56 |
| 2012/0024266 | A1* | 2/2012 | Serra | F02D 41/0007 |
| | | | | 123/564 |
| 2012/0272736 | A1 | 11/2012 | Griffaton | |
| 2018/0306672 | A1* | 10/2018 | Pattom | F04D 13/04 |

OTHER PUBLICATIONS

European Search Report in European Application No. 20170418.6, mailed Nov. 27, 2020, 17 pages.
Lei Hu, et al "Modeling the Relationship between Vibration Features and Condition Parameters Using Relevance Vector Machines for Health Monitoring of Rolling Element Bearings under Varying Operation Conditions", Mathematical Problems in Engineering, vol. 2015, Jan. 1, 2015, pp. 1-10.

* cited by examiner

ROTATING MACHINE SPEED ESTIMATION

FIELD OF THE INVENTION

Embodiments hereof relate to a process for estimating a rotational speed of a rotating component and a process for estimating a rotor imbalance of a rotating component.

BACKGROUND OF THE INVENTION

For applications utilising rotating machines it is often important to accurately determine the speed at which a rotating component of the rotating machine is being operated. For example, the rotational speed can be used to evaluate the loading that the rotating component has been subjected to, which in turn can be used to estimate when the system may require maintenance.

Several approaches are known in the prior art to measure rotational speeds. Prior art approaches commonly involve speed measurement devices, such as tachometers or blade tip timing sensors based on magnetic or inductive sensors.

These approaches suffer various drawbacks. Both tachometers and blade tip timing sensors can be difficult to mount, for example due to limited space or limited accessibility to the rotating component. In addition, all known approaches are susceptible to damage and lead to inaccurate measurement results at high temperatures and in dirty environments. For example, the tachometer or blade tip timing sensors may include a laser, resulting in increasingly inaccurate measurements or even complete failure over time in high temperature and dirty environments.

Another approach utilises speed estimation algorithms based on a spectral analysis of recorded vibration signals. Deriving a rotational speed from a single peak or signal in the power spectrum can be problematic, because an erroneous assignment of the rotational speed may occur. The speed estimation algorithms usually comprise identifying a harmonic train, i.e. a sequence of peaks in the power spectrum of the vibration signal. The member of the harmonic train with the largest amplitude is commonly used to determine the rotational speed of the rotating machine.

If the rotating component contains a plurality of blades or the like, then the highest amplitude member of the harmonic train is expected to emerge at the blade-pass frequency of the rotating component. The blade-pass frequency can easily be related to the rotating speed (by dividing by the number of blades).

However, prior art speed estimation algorithms also have significant drawbacks. The algorithms are prone to misidentifying the rotating speed by a factor or quotient of a small integer. Specifically, if no prior knowledge of the rotating speed of the rotating component is available, then an approach based purely on identifying the frequency (or group of frequencies) which has the largest amplitude component in the spectrum can erroneously identify harmonics of the rotating speed to be the rotating speed itself. This is particularly true in cases where the frequency response of the sensor, and/or the rotating machine and/or other components which may be attached or coupled to the rotating machine (e.g. a casing), attenuates components at lower frequencies more than those at higher frequencies. In other words, a harmonic train at, for example, 1, 2, or 3 times the frequency f may be indistinguishable from a harmonic train at 2, 4, 6 times the frequency f/2. This problem may also be labelled as 'Octave Error.'

In addition, further problems in the spectral analysis of the recorded vibration signal may occur, for instance the vibration signal may be too noisy to allow for a reliable identification of a harmonic train, and/or multiple harmonic trains may be identified, and/or accidental correlations between signals/peaks in the power spectrum may interfere with another.

BRIEF SUMMARY OF THE INVENTION

Briefly, a process for estimating a rotational speed of a rotating component and a process for estimating a rotor imbalance of a rotating component are provided to overcome at least some of the abovementioned limitations. This object is accomplished by means of a process for estimating a rotational speed of a rotating component according to claim 1, and a process for estimating a rotor imbalance of a rotating component according to claim 12. In particular, the object of the invention is to improve the accuracy and/or robustness estimation of the rotating speed of a rotating machine, especially at demanding operating conditions, including high temperatures and dirty environments.

According to an embodiment, a process for estimating a rotational speed of a rotating component for a charging system is provided. The process comprises:
  Measuring a vibration signal of the rotating component by means of a sensor;
  Identifying harmonic train members from a plurality of peaked components of the vibration signal; and determining a candidate fundamental frequency from the harmonic train members;
  Determining a derived vibration amplitude value from the vibration signal; and
  Verifying a consistency condition between the derived vibration amplitude value and the candidate fundamental frequency using a predetermined speed-amplitude map.

According to another embodiment, a process for estimating an acceptable rotor imbalance of a rotating component is provided. The process comprises the steps:
  A) Operating the rotating component at a first plurality of rotational speeds;
  Determining a derived vibration amplitude value for each of the first plurality of rotational speeds;
  Establishing a first speed-amplitude map; and subsequent to step A):
  B) Operating the rotating component at a second plurality of rotational speeds;
  Determining a derived vibration amplitude value for each of the second plurality of rotational speeds;
  Establishing a second speed-amplitude map;
  C) Estimating the rotor imbalance of the rotating component based on a comparison between the first speed-amplitude map and the second speed-amplitude map.

Those skilled in the art will recognise additional features and advantages upon reading the following detailed description, and upon viewing the accompanying drawings.

BRIEF DESCRIPTION OF THE DRAWINGS

The components in the Figures are not necessarily to scale, instead emphasis being placed upon illustrating the principles of the invention. Moreover, in the Figures, like reference signs designate corresponding parts. In the drawings.

DETAILED DESCRIPTION OF THE INVENTION

Figure 1:
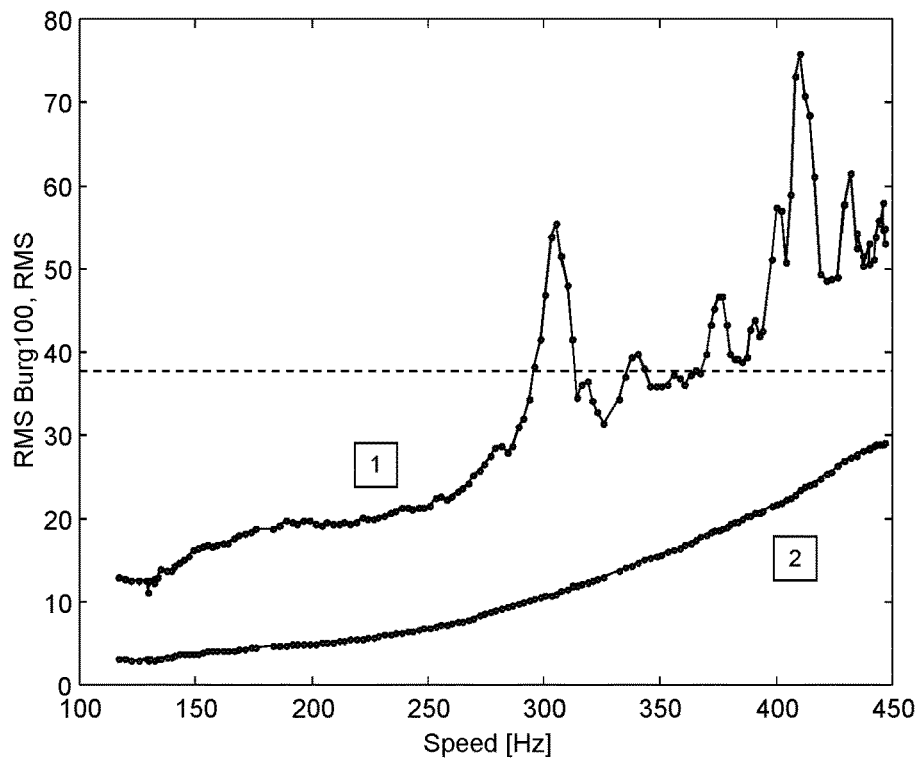
FIG. 1 illustrates an example of a derived vibration amplitude according to an embodiment of the present disclosure.

In the following detailed description, reference is made to the accompanying drawings, which form a part hereof, and in which are shown by way of illustration specific embodiments of the invention.

As used herein, the terms "having", "containing", "including", "comprising" and the like are open ended terms that indicate the presence of stated elements or features, but do not preclude additional elements or features.

It is to be understood that other embodiments may be utilised, and structural or logical changes may be made without departing from the scope of the present invention. The following detailed description, therefore, is not to be taken in a limiting sense, and the scope of the present invention is defined by the appended claims. The embodiments described herein use specific language, which should not be construed as limiting the scope of the appended claims. Each embodiment and each aspect so defined may be combined with any other embodiment or with any other aspect unless clearly indicated to the contrary.

According to an embodiment, a process for estimating a rotational speed of a rotating component for a charging system is provided.

The process includes measuring a vibration signal of the rotating component by means of a sensor. The term "vibration signal" specifically encompasses (and preferably represents) a time domain representation of a measurement obtained with the sensor. The frequency domain representation of the measurement obtained with the sensor is referred to as "power spectrum" herein.

The sensor may for example be an accelerometer, a microphone, or a velocity sensor. The sensor may be configured for measuring multiple types of signals or measuring along multiple axis. For example, the sensor may be a tri-axis accelerometer.

The process may further include the step of identifying peaked components in the vibration signal, in particular in the spectrum of the vibration signal. The identification of the peaked components may be facilitated in the frequency domain representation (i.e. from the power spectrum), but likewise may be determined from the vibration signal. The process may further include determining a frequency of each of the peaked components. For example, the peaked components may be extracted from the vibration signal, by calculating the power spectrum; optionally fitting a background signal and subtracting the background signal; and identifying the peaked components based on a polynomial fit to the amplitude of each peaked component. This step may also be referred to as a "peak arithmetic" approach.

The process may further include extracting harmonic train members from the plurality of peaked components. The harmonic train members may be distinguished from other peaked components which are not harmonic train members, in that the frequency of each harmonic train member is a substantially integer fraction or substantially integer multiply of at least one other member of the harmonic train members. In other words, the process may include selecting the harmonic train member whose integer fractions and integer multiples best fit the remaining members of the harmonic train members. It is to be understood, that the term "substantially" is not to be interpreted as being as accurate as the measurement of the sensor or as a round-off, but instead is to be understood such that a tolerance threshold may be predefined in the method. The tolerance threshold may for example be 1% of the respective peak frequency. Peaked components not lying within an integer fraction or integer multiple plus/minus the tolerance threshold may then not be considered as harmonic train members. For example, the tolerance threshold may be 1% of the integer fraction or integer multiple.

The process includes determining a candidate fundamental frequency from the harmonic train members. The candidate fundamental frequency is assumed to correspond to the rotational speed of the rotating component as a working hypothesis. Several of the other steps of the process according to the present disclosure are carried out in order to verify whether the candidate fundamental frequency actually corresponds to the rotational speed. Embodiments of the present disclosure are intended to avoid the "octave error" and thus avoid yielding an erroneous rotational speed. The candidate fundamental frequency may also be referred to as the likely rotational speed. Illustratively, the candidate fundamental frequency may be determined as a harmonic train member being a substantially integer fractions or substantially integer multiple of all other harmonic train members.

In alternative embodiments, the candidate fundamental frequency is assumed to correspond to the blade-pass frequency as a working hypothesis. For the purpose of comparison (as for example disclosed in the section "Consistency condition" further below) the candidate fundamental frequency may be divided by the number of blades of the rotating component to obtain an assumed rotational speed of the rotating component.

The process further includes determining the rotational speed from the candidate fundamental frequency only in case of a positive verification result of the verifying step.

Derived Vibration Amplitude

The inventors have found that measured vibration signals contain further information which can be used to improve the estimation of the rotational speed of the rotating component. In order to illustrate this, reference is made to FIG. 1.

FIG. 1 displays the vibration amplitude as a function of the rotational speed. The upper curve presented in FIG. 1 (labelled as curve "1") corresponds to the root mean square (RMS) vibration amplitude for each respective rotational speed of the rotating component. For the purpose of FIG. 1, the rotating component was operated at a range of varying rotational speeds. As a rule of thumb, the RMS vibration amplitude exhibits a tendency to increase with increasing rotational speeds, however, a monotonous increase is not observed. As a result, some specific RMS amplitude values may correspond to multiple rotational speed (see for example dashed line in FIG. 1). Furthermore, resonance or peaks are visible in the RMS vibration amplitude as a function of the rotational speed. As can be seen for example at a rotational speed of just above 300 Hz, a sudden increase followed by a sharp decrease in the RMS vibration amplitude is observed. This resonance or peak may be a result of a frequency response of the sensor, and/or the rotating machine and/or other components which may be attached or coupled to the rotating machine, Utilising the RMS vibration amplitude of the vibration signal in the form shown in the upper curve of FIG. 1 appears to be tedious, and impractical.

The process according to embodiments of the present disclosure includes determining a derived vibration amplitude value from the vibration signal. The derived vibration amplitude value is based on the vibration signal, but does not correspond to the RMS vibration amplitude or any comparable means for directly computing a vibration amplitude value.

The determination of the derived vibration amplitude value is not limited to a specific mathematical operation or the like. The determination step is performed such that the derived vibration amplitude value is substantially or fully independent of frequency responses of any of the components used, e.g. any components of the sensor, an orientation of the sensor, the rotating machine and/or other components attached or coupled to the rotating machine. The derived vibration amplitude value is related to other standard statistical metrics, such as for instance the root mean square of vibration. However, in contrast to other standard statistical metrics, the derived vibration amplitude value is not or largely not affected by case specific system responses. The derived vibration amplitude value may also be referred to as a "peakless amplitude value" and/or a "system response independent amplitude value". In simple terms, the derived vibration amplitude may be determined by discarding at least some of the spectral points with highest amplitudes originating from case specific system responses. Preferably, the determination step is carried out such that the derived vibration amplitude exhibits a largely or fully monotonic behaviour with increasing rotational speed.

The lower curve in FIG. 1 further illustrates an example (labelled as curve "2") of the derived vibration amplitude, i.e. the derived vibration amplitude values for each respective rotational speed. The derived vibration amplitude exhibits a smooth monotonous increase with rotational speed.

According to one embodiment, the determination step comprises at least two steps. The vibration signal is filtered. The filtering step may be carried out directly from the vibration signal (in time domain representation) or alternatively the power spectrum may be calculated and the filtering step may be derived from the power spectrum. Typically, filtering the vibration signal includes removing or subtracting one or more high amplitude contributions to the vibration signal (i.e. specific high amplitude contributions), in particular high amplitude contributions resulting from systems responses, e.g. resonance enhancements. Preferably, the filtering does not include removing entire ranges from the vibration signal. For example, a low pass or high pass or band pass filtering of the vibration signal is not intended. Subsequently, determining the derived vibration amplitude value may include determining a total vibration amplitude of the filtered vibration signal. This step also may be performed in the time domain representation or derived from the power spectrum in the frequency domain representation. The total vibration amplitude is preferably an integrated amplitude value determined from the (preferably filtered) vibration signal. The total vibration amplitude is preferably a scalar value.

Illustratively, determining the derived vibration amplitude value in the time domain includes digitally filtering the vibration signal. According to one exemplary embodiment, the highest amplitude periodic components N are identified using the Burg's method and subtracted away from the vibration signal. In one example, N=100 is selected. Subsequently, the determination of the derived vibration amplitude value may include determining a total vibration amplitude of the digitally filtered vibration signal. According to one exemplary embodiment, the total vibration amplitude is calculated as the root mean square of the digitally filtered time waveform. Typically, the total vibration amplitude is the derived vibration amplitude value. The derived vibration amplitude shown in FIG. 1 was calculated by using Burg's method with N=100, subtracting away the top N components and calculating the RMS of the time waveform.

Illustratively, determining the derived vibration amplitude value in the frequency time domain includes filtering by means of subtracting (removing) at least a portion of high amplitude signals to the vibration signal. For example, the top at least 10% or at least 15% of the highest amplitude signals of the power spectrum may be removed. Subsequently, the determination of the derived vibration amplitude value may include determining a total vibration amplitude of the filtered power spectrum. According to one exemplary embodiment, the total vibration amplitude value is calculated as the root-sum-square of the filtered power spectrum. Typically, the total vibration amplitude is the derived vibration amplitude value. Advantageously, the frequency domain calculation may be performed at lower computational cost than the time domain calculation. Further, in case the power spectrum is calculated for identifying the harmonic train members, the power spectrum is already available.

Speed-Amplitude Map

Embodiments of the present disclosure utilise a predetermined speed-amplitude map for verifying or estimating properties of the rotating component. The predetermined speed-amplitude map enables predicting an expected behaviour or expected properties of the rotating component. The predetermined speed-amplitude map may correspond to or be derived from previous measurements at which the rotating component has been operated. The predetermined speed-amplitude map preferably either is a table (speed-amplitude table) containing information on the rotating component or is derived from the speed-amplitude table.

The speed-amplitude table may also be referred to as repository or the like, i.e. the table corresponds to an information storage containing several entries. The entries in the speed-amplitude table include rotational speeds at which the rotating component has been operated and the respective derived vibration amplitude values. The speed-amplitude table may also be referred to as "rotational speed-derived vibration amplitude value-table", but is not labelled as such in the following for the sake of brevity. The speed-amplitude map may also be referred to as "rotational speed-derived vibration amplitude value-map". The speed-amplitude table may also include further information, such as a respective time and date, however, all further entries apart from the rotational speeds and the respective derived vibration amplitude values are optional.

According to an embodiment, establishing the predetermined speed-amplitude map includes operating the rotating component at a plurality of rotational speeds, and determining respective derived vibration amplitude values for each of the rotational speeds. The derived vibration amplitude values are determined according to one of the embodiments disclosed herein. The speed-amplitude table may be established by adding the predetermined rotational speeds and the respective derived vibration amplitude values. The predetermined speed-amplitude map preferably either is the speed-amplitude table or is derived from the speed-amplitude table.

For example, in case the speed-amplitude table contains a large number of entries, the speed-amplitude map may be taken as the speed-amplitude table. A comparison between candidate fundamental frequency and/or derived vibration amplitude value with the speed-amplitude map (as discussed in detail further below), may simply be performed based on a "nearest neighbour" search for the entries in the speed-amplitude table.

In another embodiment the process includes determining a speed-amplitude map function, e.g. a best-fit function, based on entries in the speed-amplitude table. The inventors empirically found that a map function derived from the rotational speed as a function of either the decadic logarithm of the derived vibration amplitude values or the cube root of the derived vibration amplitude values are particularly suitable. For both types a largely linear behaviour has been observed over a large range of rotational speeds, thus allowing to formulate the map function with just two parameters (slope and intercept). Typically, the speed-amplitude map function may be the speed-amplitude map.

Other embodiments of the speed-amplitude map are also possible. For example, the process may include utilising a learning algorithm based on entries in the speed-amplitude table for finding a best-fit model function, such as a neural network or a Support Vector Machine.

Figure 2:
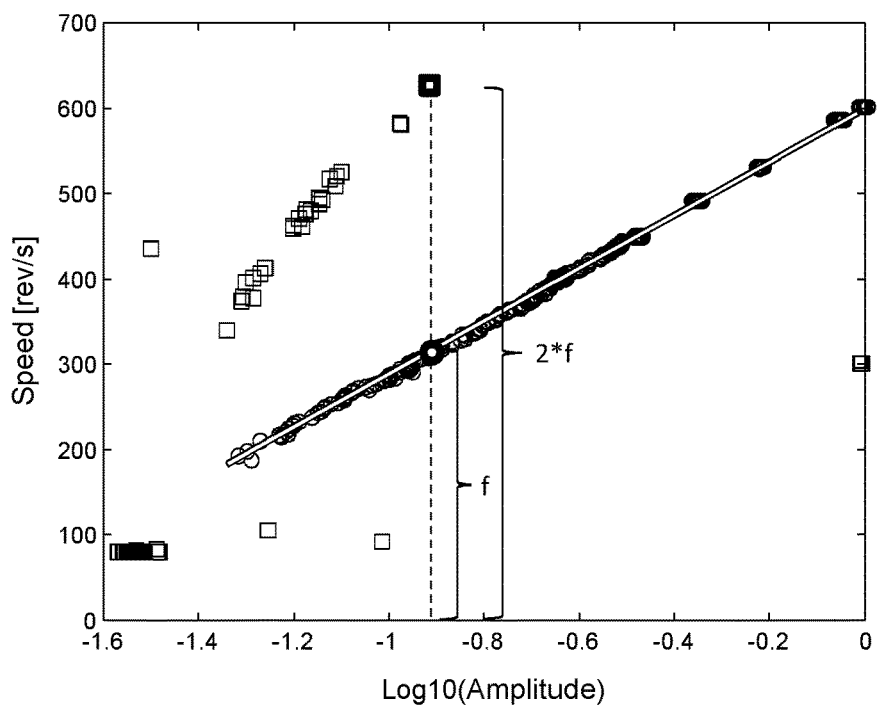
FIG. 2 illustrates a speed-amplitude table and a speed-amplitude map function according to an embodiment of the present disclosure.

FIG. 2 illustrates an example of the speed-amplitude table and the speed-amplitude map function. The entries of the speed-amplitude table are displayed as open circles, while the squares displayed in FIG. 2 are considered outliers. One exemplary embodiment of the speed-amplitude map function is shown in FIG. 2 as linear function, illustrated as a white line. A higher-order polynomial speed-amplitude map function may also be advantageous.

Establishing the speed-amplitude map may be put into practise in several different ways. According to an exemplary embodiment, the entries of the speed-amplitude table are generated in a calibration step. For that purpose, establishing the predetermined speed-amplitude map includes operating the rotating component at a plurality of predetermined rotational speeds, and determining respective derived vibration amplitude values for each of the predetermined rotational speeds.

However, it is not necessary to perform a calibration step according to the present disclosure. According to another exemplary embodiment, the entries of the speed-amplitude table are generated as part of a normal operation of the rotating component. It is preferable to generate the entries of the speed-amplitude table by varying the range of rotational speeds substantially. For example, it may suffice to generate entries for the speed-amplitude table while taking the rotating component into operation, i.e. during a warm-up phase, or during a "speed up" or "coast down" operation of the rotating component.

Consistency Condition

Embodiments of the present disclosure utilise a consistency condition between the derived vibration amplitude value and the candidate fundamental frequency using the predetermined speed-amplitude map. As disclosed above, the "candidate fundamental frequency" is assumed to be the rotational speed of the rotating component as a working hypothesis. The process includes verifying the consistency condition in order to estimate whether or not this working hypothesis is reliable. In its broadest meaning the consistency condition is to be understood as a comparison utilising on the one hand the derived vibration amplitude value and the candidate fundamental frequency determined from the measured vibration signal and on the other hand one or more entries from the speed-amplitude map.

The speed-amplitude map enables determining an expected rotational speed for a given derived amplitude value and/or enables determining an expected derived amplitude value for a given rotational speed. The consistency condition allows for verifying whether the candidate fundamental frequency corresponds to the rotational speed of the rotating component in case values (derived vibration amplitude value, candidate fundamental frequency) determined from the vibration signal are within ranges expected from the speed-amplitude map.

According to one embodiment, verifying the consistency condition includes determining an expected rotational speed for the derived vibration amplitude value from the speed-amplitude map to verify whether the candidate fundamental frequency corresponds to the rotational speed. Illustratively, the expected rotational speed may be determined from the speed-amplitude map based on identifying a nearest neighbour to the derived vibration amplitude value in the speed-amplitude table. According to another illustrative aspect the expected rotational speed may be determined from by calculation based on the speed-amplitude map function.

The consistency condition may include one or more of the following specifications:

a) if the candidate fundamental frequency is substantially equal to the expected rotational speed, the rotational speed is determined to correspond to the candidate fundamental frequency. In this case, it is concluded that the candidate fundamental frequency lies within a range expected from the speed-amplitude map, therefore the working hypothesis may be confirmed, i.e. the candidate fundamental frequency is determined to correspond to the rotational speed.

It is to understood, that the term "substantially" is not to be interpreted as being as accurate as the measurement of the sensor or as a round-off, but instead is to be understood such that a tolerance threshold may be predefined. For example, it may be defined that a candidate fundamental frequency lying within +10% of the expected rotational speed is considered substantially equal. This definition of the term "substantially" applies both to condition a), as well as to conditions b) and c) disclosed below.

b) if the candidate fundamental frequency is substantially equal to an integer fraction or an integer multiple of the expected rotational speed, the rotational speed is determined to correspond to the candidate fundamental frequency divided by the integer fraction or the integer multiple ratio. For that purpose, it may be beneficial to calculate a ratio of the candidate fundamental frequency and the expected rotational speed. In this case, it is concluded that the candidate fundamental frequency does not lie within a range expected from the speed-amplitude map, and therefore the working hypothesis may be disaffirmed. An "octave error" has occurred in determining the candidate fundamental frequency. According to embodiments of the present disclosure, it is therefore intended to correct any "octave errors" having occurred in determining the candidate fundamental frequency.

An example of a candidate fundamental frequency differing by an integer multiple ratio from the expected rotational speed is illustrated in FIG. 2. The data point marked as a thick square corresponds to a pair of determined derived vibration amplitude value and respective candidate fundamental frequency. The candidate fundamental frequency is far removed from the speed-amplitude map function or entries in the speed-amplitude table having comparable derived vibration amplitude values. The example candidate fundamental frequency in FIG. 2 differs from the expected rotational speed by a factor of 2 (e.g. compare with the thick circle in FIG. 2). According to consistency condition b), the rotational speed is determined by dividing the candidate fundamental frequency by a factor of 2. In addition, FIG. 2 shows several other examples wherein an octave error has occurred.

c) if the candidate fundamental frequency is not substantially equal to the expected rotational speed and not substantially equal to an integer fraction or an integer multiple of the expected rotational speed, the rotational speed is determined to correspond to the expected rotational speed. For illustration purposes, condition c) may apply if the candidate fundamental frequency differs from the expected rotational speed for example by a factor of 1.4. In this case, it is concluded that the determination of the candidate fundamental frequency has limited reliability. For example, this may be the case if the vibration signal is too noisy to allow for a reliable identification of the harmonic train members, and/or accidental correlations between signal/peaks in the power spectrum occur, leading to interference with another. According to condition c), the estimation of the rotational speed is determined based on the derived vibration amplitude value (by determining the expected rotational speed), whereas the candidate fundamental frequency is disregarded. According to an alternative aspect, the rotational speed may be determined to correspond to the estimated rotational speed determined in the preceding execution of the process (i.e. estimated from a previous time interval).

According to another embodiment, verifying the consistency condition includes determining an expected derived amplitude vibration value for the candidate fundamental frequency from the predetermined speed-amplitude map to verify whether the candidate fundamental frequency corresponds to the rotational speed. This embodiment is an alternative to the previous embodiment, i.e. instead of determining an expected rotational speed for the derived vibration amplitude value (as above), this embodiment includes determining an expected derived amplitude vibration value for the candidate fundamental frequency. Illustratively, the expected derived amplitude vibration value may be determined from the speed-amplitude map based on identifying a nearest neighbour to the candidate fundamental frequency in the speed-amplitude table or according to another illustrative aspect the expected derived vibration amplitude value may be determined by calculation based on the speed-amplitude map function.

The consistency condition may include the following condition:

a) if the expected derived amplitude vibration value is substantially equal to the derived vibration amplitude value, the rotational speed is determined to correspond to the candidate fundamental frequency.

The consistency condition may include further conditions such as b) and c) disclosed above for the alternative embodiment in an analogous manner.

Further Aspects

According to one aspect, the process for estimating a rotational speed of a rotating component includes updating the speed-amplitude map with the estimated rotational speed and the respective derived vibration amplitude value. It is intended to add the rotational speeds and respective derived vibration amplitude value estimated by the process to the speed-amplitude table. This additional step may increasingly improve the reliability of the speed-amplitude map and the consistency condition. It may also be intended to update or re-evaluate the speed-amplitude map function based on the updated speed-amplitude table. Typically, a threshold is defined, and pairs of estimated rotational speed and the respective derived vibration amplitude values lying above the threshold are not used, i.e. disregarded, for updating the speed-amplitude map. The threshold may be defined as a certain deviation (e.g. 5% or 10%) from one or more nearest-neighbour entries in the speed-amplitude table and/or in case a speed-amplitude map function is utilised, the threshold may be defined as a certain deviation (e.g. 5% or 10%) from a value (expected rotational speed or expected derived vibration amplitude value) calculated based on the speed-amplitude map function.

According to a general aspect of the disclosure, the process is intended to yield an estimation of the rotational speed based on a measurement with the sensor on short timescales. A measurement with the sensor may be concluded in less than 1 second. For example, each of the data points displayed in FIG. 1 were determined from a measurement collected over about 0.32 s. The rotational speed estimated as a result of the process may also be referred to as an "instantaneous rotational speed" or "current rotational speed". The process advantageously allows for a rapid and reliable determination of the rotational speed and enables monitoring changes to the rotational speed on short time scales. However, the process also allows for estimation of the rotational speed for a long-term measurement with the sensor.

According to one aspect, the process for estimating a rotational speed of a rotating component is an online process. The term "online process" as used herein is to be understood such that the process is carried out during operation of the rotating component, in particular as a real-time process based on present operating conditions of the rotating machine. The process is intended to estimate the rotational speed on short timescales, e.g. less than 1 s or within a few seconds, and provide a user with the result in real-time or virtually instantaneously. Further, the operation of the rotating component is not influenced by the process and can be carried out continuously before, during and after performing the process without the operation being impeded in any way. Further, the process may include predetermining and/or updating the speed-amplitude map, and/or determining and/or updating the speed-amplitude map function online.

According to one aspect, the sensor may be configured for measuring multiple types of signals or measuring along multiple axis. For example, the sensor may be a tri-axis accelerometer. The process may include determining the candidate fundamental frequency and the derived vibration amplitude value for each axis individually. Subsequently, and preferably before verifying the consistency condition, the plurality of candidate fundamental frequencies (resulting from each axis) and the plurality of derived vibration amplitude values (resulting from each axis) may be averaged.

According to one aspect, the rotating component is a rotating component of a turbocharging system and/or a turbocompound. Illustratively, the rotating component may a turbocharger blade and/or the rotating machine may be a turbocharger. Embodiments of the present disclosure are particularly advantageous for charging systems, especially for combustion engines, and in particular turbocharging systems and/or turbocompounds as remote sensing is enabled, especially at demanding operating conditions, including high temperatures and dirty environments.

Embodiments of the present disclosure enable various further advantages, including an online update and a continuous readout of the rotational speed. The estimation of the rotational speed allows for determining the load profile of the rotating machine, and in particular continuously determining the load profile. The process also significantly improves the reliability and robustness of a rotational speed estimation over prior art methods. The process allows for operating a rotating component and a rotating machine at the highest levels of capacity, reliability, flexibility and security, whilst extending the system lifecycle.

Process for Estimating an Acceptable Rotor Imbalance

According to an embodiment, a process for estimating an acceptable rotor imbalance of a rotating component is provided. The process for estimating an acceptable rotor imbalance is linked to the process for estimating a rotational speed and largely comprises the same features as the latter. The process for estimating an acceptable rotor imbalance preferably also includes estimating a rotational speed of the rotating component, and in particular includes determining a derived vibration amplitude value from the vibration signal and utilising a speed-amplitude map.

Estimating an acceptable rotor imbalance of the rotating component includes a step A) and a step B). Steps A) and B) are carried out at different points in time, wherein step B) is carried out after step A). Preferably, step A) is carried out at a point in time when the rotating component exhibits marginal or no imbalance, e.g. after initially putting into operation or after maintenance. For example, step B) may be carried out hours, days, months or even years after step A). The results obtained by carrying out steps A) and B) may each be regarded as characterising the state or condition of the rotating component at that point in time. Changes in the state or condition of the rotating component conditions are usually rather to be expected within a time frame of months or years, however this depends on the application as such. It is preferred to perform the same sub-steps for steps A) and B), to facilitate comparison between steps A) and B). However, it is not necessary to carry out steps A) and B) with the same technical parameters (e.g. the same rotational speed).

Step A) includes the following sub-steps:
Operating the rotating component at a first plurality of rotational speeds;
Determining a derived vibration amplitude value for each of the first plurality of rotational speeds; and
Establishing a first speed-amplitude map.

Preferably, step A) includes measuring a first plurality of vibration signals of the rotating component by means of a sensor.

According to one aspect, operating the rotating component may be performed at a plurality of predetermined rotational speeds. In this case, the rotational speed is known and the process does not require determining the rotational speed. This aspect may also be referred to as a calibration step.

However, it is not necessary to perform a calibration step according to the present disclosure. According to another aspect, the rotating component may be operated as part of a normal operation of the rotating component. In this case, the process may include the steps of identifying harmonic train members from a plurality of peaked components of the vibration signal spectrum according to any embodiment of the present disclosure, and determining a candidate fundamental frequency from the harmonic train members according to any embodiment of the present disclosure.

The steps of determining a derived vibration amplitude value for each of the first plurality of rotational speeds, and establishing a first speed-amplitude map may be carried out according to any embodiment of the present disclosure.

Once the first speed-amplitude map contains a certain number of entries, the process may further include verifying a consistency condition between the derived vibration amplitude value and the candidate fundamental frequency using the first speed-amplitude map. The derived vibration amplitude value and the respective candidate fundamental frequency may then either be added to the first speed-amplitude table or be disregarded.

Establishing the first speed-amplitude map may include establishing a first speed-amplitude table according to any embodiment of the present disclosure. The first speed-amplitude table may include the first plurality of rotational speeds and the respective derived vibration amplitude values. The first speed-amplitude map may preferably either be the speed-amplitude table or be derived from the speed-amplitude table. In addition, establishing the first speed-amplitude map may include determining a first speed-amplitude map function based on entries in the first speed-amplitude table. The first speed-amplitude map function may be determined according to any embodiment of the present disclosure.

The same considerations and/or sub-steps apply to step B). Preferably, step B) includes measuring a second plurality of vibration signals of the rotating component by means of a sensor.

The process further includes step C), estimating an imbalance of the rotating component based on a comparison between the first speed-amplitude map and the second speed-amplitude map. The inventors surprisingly found that the speed-amplitude map changes over time depending on the state or condition of the rotating component.

Figure 3:
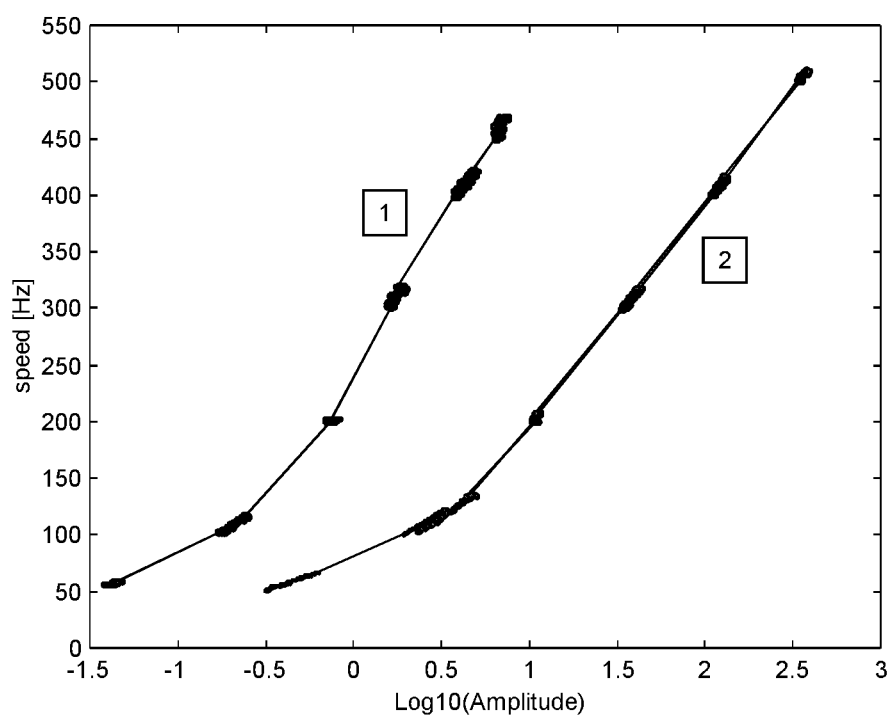
FIG. 3 displays examples of speed-amplitude maps for different levels of rotor imbalance according to an embodiment of the present disclosure.

To illustrate this finding, FIG. 3 shows the entries in the first speed-amplitude table (points along "[1]") and the first speed-amplitude map function (line through points along "[1]") recorded at a first instant in time, and the entries in the second speed-amplitude table (points along "[2]") and the second speed-amplitude map function (line through points along "[2]") recorded after introducing an imbalance to the rotor. The rotational speed exhibits a rather similar behaviour as function of the derived vibration amplitude for both curves. However, a shift between the first and second speed-amplitude maps is visible, corresponding to about an order of magnitude in the derived vibration amplitude value (for comparable rotational speeds). The inventors observed that this shift originates from and increases with a rotor imbalance.

Comparing the first speed-amplitude map and the second speed-amplitude map enables estimating whether or not the rotor imbalance is on an acceptable level. The process advantageously allows for an early detection of rotor imbalance problems. The process may assist in making decisions on whether or not maintenance to the rotating component or the rotating machine is required. The process may therefore facilitate servicing the rotating component or the rotating machine at an early stage and thus eliminating more elaborate maintenance or even complete failure. The operation of the rotating component is not influenced by the process and can be carried out without impeding the operation of the rotating component in any way.

Estimating an imbalance of the rotating component may be based on a shift between the first speed-amplitude map and the first speed-amplitude map. The shift may be quantified as an average shift in the derived vibration amplitude value between the first speed-amplitude map and the second speed-amplitude map, e.g. based on an average shift in the derived vibration amplitude value between the entries of the first and second speed-amplitude table.

Estimating whether or not an imbalance of the rotating component is acceptable may be based on a predefined or user-defined parameter, in particular an empirically established parameter. The imbalance may be considered as not acceptable in case the predefined or user-defined parameter surpasses a predetermined imbalance threshold.

Estimating an imbalance of the rotating component may be based on a parameter used to define the speed-amplitude map function. For example, the estimation may be based on a rotational speed offset or a derived amplitude offset between the first speed-amplitude map function and the second speed-amplitude map function. For example, in FIG. 3 curve "2" appears to mainly shifted compared to curve "1" along the x-axis (i.e. the decadic logarithm of the derived amplitude). Alternatively, the offset may also be specified as a combination of a rotational speed offset and a derived amplitude offset. The imbalance may be considered as not acceptable in case the offset is larger than the predetermined imbalance threshold.

According to one embodiment the process for estimating an acceptable rotor imbalance of a rotating component includes:
A) Performing the process for estimating the rotational speed of the rotating component at a first plurality of rotational speeds according to any embodiment of the present disclosure;
and subsequent to step A):
B) Performing the process for estimating the rotational speed of the rotating component at a second plurality of rotational speeds according to any embodiment of the present disclosure; and
C) Estimating the rotor imbalance of the rotating component based on a comparison between the first speed-amplitude map and the second speed-amplitude map.

According to one aspect, the rotating component is a rotating component of a turbocharging system and/or a turbocompound. Illustratively, the rotating component may a turbocharger blade and/or the rotating machine may be a turbocharger. Embodiments of the present disclosure are particularly advantageous for charging systems, and in particular turbocharging systems and/or turbocompounds as remote sensing is enabled, especially at demanding operating conditions, including high temperatures and dirty environments. Embodiments of the present disclosure enable various further advantages, including an online update and a continuous readout of the rotational speed.

The invention claimed is:

1. A process for estimating a rotational speed of a rotating component for a charging system, the process comprising:
measuring a vibration signal of the rotating component by means of a sensor;
identifying harmonic train members from a plurality of peaked components of the vibration signal; and determining a candidate fundamental frequency from the harmonic train members;
determining a derived vibration amplitude value from the vibration signal;
wherein the step of determining the derived vibration amplitude value comprises filtering the vibration signal by removing the highest amplitude signals to the vibration signal and determining a total vibration amplitude of the filtered vibration signal; and
verifying a consistency condition between the derived vibration amplitude value and the candidate fundamental frequency using a predetermined speed-amplitude map,
wherein the total vibration amplitude is based on the root-sum-square of the filtered vibration signal, or the total vibration amplitude is based on the root-mean-square of the filtered vibration signal, and
wherein the rotating component is a rotating component of a turbocharging system and/or a turbocompound.

2. The process according to claim 1, wherein verifying the consistency condition comprises:
determining an expected rotational speed for the derived vibration amplitude value from the speed-amplitude map to verify whether the candidate fundamental frequency corresponds to the rotational speed.

3. The process according to claim 2, wherein:
if the candidate fundamental frequency is substantially equal to the expected rotational speed, the rotational speed is determined to correspond to the candidate fundamental frequency; or else if;
if the candidate fundamental frequency is substantially equal to an integer fraction or an integer multiple of the expected rotational speed, the rotational speed is determined to correspond to the candidate fundamental frequency divided by the integer fraction or the integer multiple ratio; or else if;
if the candidate fundamental frequency is not substantially equal to the expected rotational speed and not substantially equal to an integer fraction or an integer multiple of the expected rotational speed, the rotational speed is determined to correspond to the expected rotational speed.

4. The process according to claim 1, further comprising establishing of the predetermined speed-amplitude map by:
operating the rotating component at a plurality of rotational speeds; and
determining respective derived vibration amplitude values for each of the rotational speeds; and
establishing a speed-amplitude table comprising the rotational speeds and the respective derived vibration amplitude values.

5. The process according to claim 4, wherein determining the speed-amplitude map includes:
determining a speed-amplitude map function based on entries in the speed-amplitude table.

6. The process according to claim 1, further comprising the step:
updating the speed-amplitude map with the estimated rotational speed and the respective derived vibration amplitude value.

7. The process according to claim 1, wherein the filtering of the vibration signal includes:
removing at least 10% of signals having a highest amplitude of a power spectrum of the vibration signal.

8. The process according to claim 1, wherein the process is an online process.

9. The process according to claim 1, where in the step of extracting harmonic train members comprises:
identifying peaked components in the vibration signal and determining a frequency of each of the peaked components; and
extracting harmonic train members from the plurality of peaked components, the frequencies of each harmonic train member being substantially integer fractions or substantially integer multiples of at least one other member of the harmonic train members.

10. A process for estimating an acceptable rotor imbalance of a rotating component, the process comprising the steps:
operating the rotating component at a first plurality of rotational speeds and measuring a first plurality of vibration signals of the rotating component;
determining a derived vibration amplitude value for each of the first plurality of rotational speeds;
wherein the step of determining the derived vibration amplitude value comprises filtering the first plurality of vibration signals by removing the highest amplitude signals to the vibration signal and determining a total vibration amplitude of the filtered vibration signal of the first plurality of vibration signals;
establishing a first speed-amplitude map; and subsequently:
operating the rotating component at a second plurality of rotational speeds and measuring a second plurality of vibration signals of the rotating component;
determining a derived vibration amplitude value for each of the second plurality of rotational speeds;
wherein the step of determining the derived vibration amplitude value comprises filtering the second plurality of vibration signals by removing high amplitude signals to the vibration signal and determining a total vibration amplitude of the filtered vibration signal of the second plurality of vibration signals;
establishing a second speed-amplitude map;
estimating the rotor imbalance of the rotating component based on a comparison between the first speed-amplitude map and the second speed-amplitude map,
wherein the total vibration amplitude of the filtered vibration signal of the first plurality of vibration signals and/or of the filtered vibration signal of the second plurality of vibration signals is based on the root-sum-square of the filtered vibration signal spectrum, or the total vibration amplitude of the filtered vibration signal of the first plurality of vibration signals and/or of the filtered vibration signal of the second plurality of vibration signals is based on the root-mean-square of the filtered vibration signal of the first plurality of vibration signals and/or of the filtered vibration signal of the second plurality of vibration signals, and
wherein the rotating component is a rotating component of a turbocharging system and/or a turbocompound.

11. The process according to claim 10, further comprising:
establishing the first speed-amplitude map by:
establishing a first speed-amplitude table comprising the first plurality of rotational speeds and the respective derived vibration amplitude values;
determining a first speed-amplitude map function based on entries in the first speed-amplitude table;
establishing the second speed-amplitude map by:
establishing a second speed-amplitude table comprising the second plurality of rotational speeds and the respective derived vibration amplitude values;
determining a second speed-amplitude map function based on entries in the second speed-amplitude table; and
estimating an imbalance of the rotating component based on a shift between the first speed-amplitude map and the second speed-amplitude map.

12. The process according to claim 1, wherein predetermining the speed-amplitude map and/or determining the speed-amplitude map function is carried out online.

13. The process according to claim 11, further comprising estimating an imbalance of the rotating component based on a rotational speed offset or a derived amplitude offset between the first speed-amplitude map function and the second speed-amplitude map function.

* * * * *